United States Patent [19]

Goldowsky et al.

[11] 4,456,378
[45] Jun. 26, 1984

[54] OPTICAL POSITION SENSOR

[75] Inventors: Michael P. Goldowsky, Valhalla; Herman J. Kolbinger, New City, both of N.Y.

[73] Assignee: North American Philips Corporation, New York, N.Y.

[21] Appl. No.: 333,073

[22] Filed: Dec. 21, 1981

[51] Int. Cl.³ .............................................. G01B 11/14
[52] U.S. Cl. .................. 356/373; 250/237 R; 356/375
[58] Field of Search .................. 356/25-28, 356/373, 375, 372; 250/231 R, 231 SE, 231 P, 237 R, 214 AG, 214 B, 561, 577; 73/655, 653, 119 R, 800; 33/125 A

[56] References Cited

U.S. PATENT DOCUMENTS

| | | | |
|---|---|---|---|
| 3,270,507 | 9/1966 | Mercier et al. | 250/231 R |
| 3,274,880 | 9/1966 | Lillestrand et al. | 250/214 R |
| 3,354,319 | 11/1967 | Loewen et al. | 250/237 R |
| 3,604,940 | 9/1971 | Matthews | 73/655 |
| 3,908,444 | 9/1975 | Peter | 73/655 |
| 4,097,731 | 6/1978 | Krause et al. | 250/214 AG |
| 4,190,767 | 2/1980 | Crouse | 250/231 SE |
| 4,224,603 | 9/1980 | Lallemand | 250/231 SE |

FOREIGN PATENT DOCUMENTS

| | | | |
|---|---|---|---|
| 909634 | 3/1954 | Fed. Rep. of Germany | 356/24 |
| 52-25660 | 2/1977 | Japan | 250/578 |
| 489593 | 7/1938 | United Kingdom | 356/372 |
| 1030205 | 5/1966 | United Kingdom | 250/577 |

*Primary Examiner*—William H. Punter
*Attorney, Agent, or Firm*—Thomas A. Briody; William J. Streeter

[57] ABSTRACT

An optical sensor for sensing the radial position of a shaft. Detection of radial movement is made when a larger or smaller portion of a light beam incident on the shaft is blocked. In order to obtain a light beam of small diameter a laser light source or fiber optic system may be used. To provide long term stability the shaft is provided with a flat or with groove that is machined around its periphery to pass the entire light beam to a detector. This signal provides AGC compensation for the light source, detector and optical system.

5 Claims, 5 Drawing Figures

OPTICAL POSITION SENSOR

This invention is related to optical position sensors. More particularly, this invention is related to an optical position sensor capable of providing radial position information for active magnetic bearings.

BACKGROUND OF THE INVENTION

One use of magnetic bearings is in suspending the piston of Stirling cycle cryogenic refrigerators in order to obtain long life. A major obstacle in the development of cryogenic cooler magnetic suspension systems has been the drift of the position sensor. It is a requirement of cryogenic magnetic suspension systems that their position be accurately measured. The presently used transducers for measuring shaft position are either eddy current sensors or capacitance sensors. Eddy current sensors drift as operating temperatures change. Capacitance sensors also do not possess long term stability. One reason is that surface contamination of the probe plates affect the dielectric constant between them. To achieve a high output sensitivity, capacitance type sensors must also be placed very close to the target. Moreover, the electronics employed with eddy current and capacitance position sensors also may tend to drift. All of these disadvantages are overcome with the instant invention. Even though reflective type optical sensors exist, none possess long term stability or high sensitivity.

Accordingly, it is an object of this invention to provide an optical position sensor for obtaining position information of a member.

It is a further object of this invention to provide an optical position sensor to obtain position information for active linear magnetic bearings.

It is yet a further object of this invention to provide an optical position sensor which possess long term stability.

It is still another object of the invention to provide long term position stability by compensating for changes in the light source output, changes in detector sensitivity or drift, and changes in the transmission properties of the optical system.

SUMMARY OF THE INVENTION

The present invention is an optical device which senses the radial movement of a shaft. Detection of radial movement is made when a portion of light incident on the shaft is blocked. As the shaft moves radially, more or less light is passed through to a light detector. The variation in the amount of light allowed to pass through is a measure of the position of the shaft. Long term stability is achieved by providing a groove on the shaft such that the entire beam diameter is allowed to momentarily pass through to the detector. This signal is used as an AGC (automatic gain control) for the light source and detector to eliminate drift.

DETAILED DESCRIPTION OF THE PREFERRED EMBODIMENTS

Figure 1A:
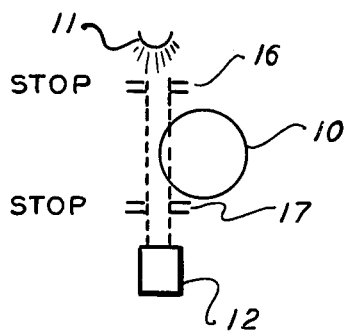
FIG. 1A is an illustration of the optical position sensor showing a light source, a movable member and a detector.
Figure 1B:
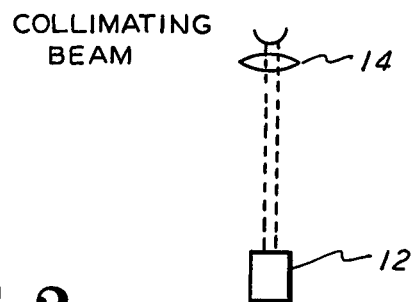
FIG. 1B shows a similar optical system including a collimating lens interposed between the light source and the movable member.

Turning to FIGS. 1A and 1B, a relatively small diameter light beam is incident on shaft 10 from light source 11 (which may be a laser) so that a portion of its light is blocked by the shaft and a portion is passed to an optical detector 12. As the shaft moves radially (left or right) more or less light is passed to the detector 12 as a measure of its position. To provide long term stability, it is necessary to compensate for changes in the output of the light source 11, changes in detector sensitivity, and changes in transmission properties of the optics. This compensation must take into account the recalibration of two quantities (1) the zero signal for base line reference signal, and (2) the system gain. By shutting off the light source for a very short period of time, such as 100 microseconds, the zero level of the detector output can be recalibrated periodically. This is a convenient method for application to cryogenic coolers where the shaft fits closely in a bore. For other applications another way to provide this zero level would be to place an increased diameter step 15 on the shaft to completely block the light.

Figure 2:
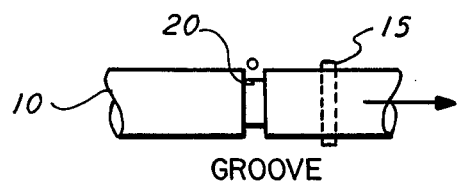
FIG. 2 is a schematic of the shaft with a calibrating groove.
Figure 3:
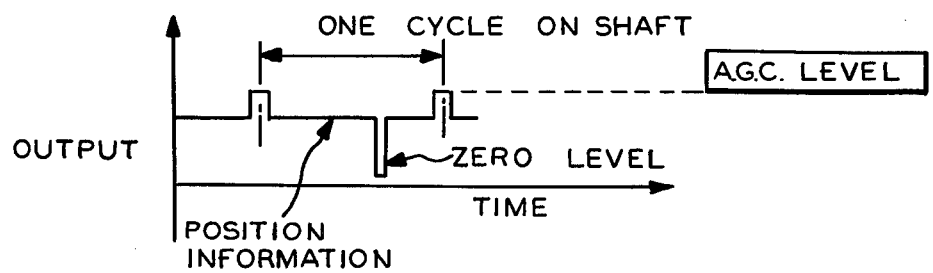
FIG. 3 shows the waveform output of the detector as the result of the axial movement of the shaft shown in FIG. 2.

Referring to FIGS. 2 and 3, in order to calibrate the optical system gain the following technique is used. A groove (FIG. 2) 20 is machined around the shaft 10 which passes the entire light beam diameter to the detector. The detector output is now made constant by varying either the light source output or the sensitivity of the detector. Doing this also compensates for the transmission properties of the optics. This type of control is termed automatic gain control, A.G.C. The groove depth is sufficient to pass all of the light beam with the expected deflection of the shaft. The actual width of the groove is made larger than the light beam diameter. The periodic axial motion of the shaft in a cryogenic refrigerator, for example, produces only a short, momentary pulse for the A.G.C. signal, which should not interfere with the performance of the magnetic bearing control system. FIG. 3 shows the resulting waveform out of the detector 12.

The light output to the detector is aproximately linear with shaft motion. Therefore, if one has two points on this calibration lines, one can construct the entire calibration line. The A.G.C. signal gives the maximum possible output or one point on the line. The zero signal gives the second or lowest possible point (where the shaft motion would block all of the light). The manner in which the zero signal is obtained can be important since, during normal operation, stray light is also present. The zero signal should include this stray light, if possible. If it is obtained by shutting off the source as proposed, there can be not stray light from the source, and we are mainly compensating for any zero drift in the detector. This will be sufficient if the stray light level is either designed to be small or does not change with time inside the cooler. The second method discussed of placing an enlarged radial area 15 on the shaft to block out the light beam momentarily, does permit stray light to be updated and is a better technique; but it does not lend itself for easy implementation in the present application.

The light beam must have a relatively small diameter and be well collimated in order to pass sufficient energy to the detector and in order to provide a high sensitivity to shaft position. This is readily accomplished using a solid state diode laser, in conjunction with a collimating lens 14 to focus the light beam as shown in FIG. 1B. Where a solid state laser and a single collimating lens are used a typical beam diameter would be 3.0 mils. If a regular laser is used the collimating lens can usually be eliminated. FIG. 1A shows the use of optical stops 16 and 17 to give a collimated beam, but much of the source energy then becomes wasted. Although this system has much less sensitivity it is less expensive to make. The light beam diameter should not be substantially larger than the maximum motion of the shaft for the best sensitivity. Optical fiber light guides, lenses or quartz windows may be installed in the housing wall to provide hermetic seals to the sensed shaft.

An alternative embodiment would provide two light sources detector systems which are located on opposite sides of the shaft. The outputs of each detector are subtracted from each other to obtain an error signal proportional to shaft position. When the shaft is centered the two outputs are equal and no error signal is present. The output goes positive for shaft motion one direction and it goes negative for motion in the opposite direction. The same light source is preferably used to illuminate both optical systems, for example, using fiber optics. Calibration of the zero reference signal is performed on the error signal. The A.G.C. signal calibrations must be performed on each detector and light source system individually. The advantage of using a two system approach is that the signal to noise ratio is at least doubled.

Figure 4:
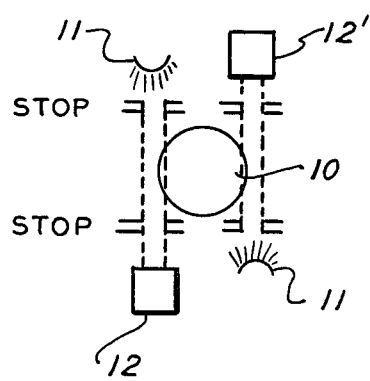
FIG. 4 shows an optical sensor similar to FIG. 1A but having dual light sources and detectors positioned on opposite sides of the shaft.

Heretofore we have been discussing reciprocating motion of a shaft and how to achieve long term stability. Another application of the position sensor would be for rotating shafts. In detecting the radial position of a rotating shaft the two optical systems as shown in FIG. 4 are placed on opposite sides of the rotating shaft. A single flat on the shaft alternately allows the full beam to enter each detector permitting A.G.C. calibration of the respective channels. The position signal from one channel or the other is always present for continuous monitoring of the shaft position. If one optical system rather than two were used, a short enough output pulse could not be obtained with the use of a flat in magnetic bearing control systems and in particular for slowly rotating shafts. This dual beam concept can also be used with an oscillating shaft to provide uninterrupted position information. To accomplish this the two beams are displaced axially and one calibration groove is used.

While there has been described what is at present considered to be the preferred embodiments of this invention, it would be obvious to those skilled in the art that various changes and modifications may be made therein without departing from the invention. And it is, therefore, intended to cover all such changes and modifications as fall within the true spirit and scope of the invention.

What is claimed:

1. An optical position sensor for sensing radial position of a shaft comprising:
    a light source;
    means for directing a beam of light from said source toward said shaft so that a portion of said beam is blocked by said shaft and a second portion of said beam is allowed to pass by said shaft;
    a light detector for detecting the portion of said beam allowed to pass by said shaft;
    the portion of said beam allowed to pass by said shaft providing a measure of the position of said shaft;
    means for periodically permitting during normal motion of said shaft all of said beam to pass by said shaft to said detector and thereby cause said detector to produce a maximum output signal;
    means for periodically preventing during normal motion of said shaft any of said beam from reaching said detector and thereby cause said detector to produce a minimum output signal;
    the maximum and minimum output signals from said detector being useful for compensating for changes in output of the light source, changes in sensitivity of the detector, and changes in transmission properties of the directing means.

2. The invention according to claim 1, wherein the means for periodically permitting all of said beam to pass by said shaft comprises a groove around said shaft.

3. The invention according to claim 2, wherein the means for preventing any of said beam from reaching said detector comprises an enlarged diameter area on said shaft.

4. The invention according to claim 1, wherein the means for periodically permitting all of said beam to pass by said shaft comprises a flat on said shaft.

5. A method for sensing radial position of a shaft comprising the steps of:
    providing a light source;
    directing a beam of light from said source toward said shaft so that a first portion of said beam is blocked and a second portion of said beam is allowed to pass by said shaft;
    detecting the portion of said beam allowed to pass by said shaft;
    the portion of said beam allowed to pass by said shaft providing a measure of the position of said shaft;
    periodically permitting during normal motion of said shaft all of said beam to pass by said shaft to said detector and thereby cause said detector to produce a maximum output signal;
    periodically preventing during normal motion of said shaft any of said beam from reaching said detector and thereby cause said detector to produce a minimum output signal;
    the maximum and minimum output signals from said detector being useful for compensating for changes in output of the light source and changes in sensitivity of the detector.

* * * * *